US010489759B2

(12) United States Patent
Hessler

(10) Patent No.: US 10,489,759 B2
(45) Date of Patent: *Nov. 26, 2019

(54) SYSTEM AND METHOD FOR MOBILE PEER AUTHENTICATION AND ASSET CONTROL

(71) Applicant: LIVEENSURE, INC., Westminster, CO (US)

(72) Inventor: Christian J. Hessler, Westminster, CO (US)

(73) Assignee: Liveensure, Inc., Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,133

(22) Filed: Oct. 12, 2018

(65) Prior Publication Data

US 2019/0057363 A1  Feb. 21, 2019

Related U.S. Application Data

(63) Continuation of application No. 15/199,191, filed on Jun. 30, 2016, now Pat. No. 10,140,600.

(60) Provisional application No. 62/187,462, filed on Jul. 1, 2015, provisional application No. 62/278,631, filed on Jan. 14, 2016.

(51) Int. Cl.
| | |
|---|---|
| *G06F 21/10* | (2013.01) |
| *G06Q 20/10* | (2012.01) |
| *G06F 21/31* | (2013.01) |
| *H04W 12/06* | (2009.01) |
| *G06Q 20/22* | (2012.01) |
| *G06Q 20/32* | (2012.01) |
| *G06Q 20/40* | (2012.01) |
| *H04W 12/00* | (2009.01) |

(52) U.S. Cl.
CPC ............. *G06Q 20/10* (2013.01); *G06F 21/10* (2013.01); *G06F 21/31* (2013.01); *G06F 21/316* (2013.01); *G06Q 20/223* (2013.01); *G06Q 20/32* (2013.01); *G06Q 20/40* (2013.01); *H04W 12/06* (2013.01); *H04W 12/00503* (2019.01); *H04W 12/00504* (2019.01); *H04W 12/00508* (2019.01)

(58) Field of Classification Search
None
See application file for complete search history.

(56) References Cited

U.S. PATENT DOCUMENTS

| | | | | |
|---|---|---|---|---|
| 2014/0201848 A1* | 7/2014 | Kulkarni | ............. | G06F 21/6218 726/27 |
| 2015/0332365 A1* | 11/2015 | Kassemi | ................ | H04L 51/38 705/26.41 |

* cited by examiner

*Primary Examiner* — William J. Goodchild
(74) *Attorney, Agent, or Firm* — Hankin Patent Law, APC; Susan L. McCain; Kevin Schraven

(57) ABSTRACT

A system and method for mobile peer authentication and asset control. The system and method may be configured to authenticate peer users across any digital network and platform and may allow users to independently control access to content they share with others across the same platforms from their computing devices. Senders may anonymously verify other mobile users according to device, location, behavior, and knowledge contexts, and may independently control or monetize shares with one or more of those peers in real-time across any social, messaging, or electronic communication network, either by value or by reference.

18 Claims, 6 Drawing Sheets

SYSTEM AND METHOD FOR MOBILE PEER AUTHENTICATION AND ASSET CONTROL

CROSS-REFERENCE TO RELATED APPLICATIONS

This Application is a Continuation of U.S. Non-Provisional patent application Ser. No. 15/199,191, filed on Jun. 30, 2016, entitled "System and Method for Mobile Peer Authentication and Asset Control", by inventor Christian J. Hessler, the contents of which are expressly incorporated herein by this reference, and to which priority is claimed. U.S. Non-Provisional patent application Ser. No. 15/199,191, claims the benefit of U.S. Provisional Patent Application No. 62/278,631, filed on Jan. 14, 2016, titled "A System and Method for Securing and Monetizing Peer-to-Peer Digital Content", by inventor Christian J. Hessler, and of U.S. Provisional Patent Application No. 62/187,462, filed on Jul. 1, 2015, titled "A System and Method for Peer Asset Authentication", by inventor Christian J. Hessler, the contents of both are expressly incorporated herein by this reference as though set forth in its entirety.

FIELD OF USE

The present disclosure relates generally to network security and authentication between peer mobile users. More particularly, the present disclosure relates to multi-factor context and content authentication security systems and methods using a mobile computing device wirelessly connected across a network using contextual factors within a defined session to identify and authenticate peer users and secure the assets and content the peer users share amongst themselves, either authored and shared or transmitted by reference or value.

BACKGROUND

Historically, the area of user authentication and content control generally involved users authenticating against factors or secrets to gain access to a device, web or cloud-based resource, or assets. All such security assertions emanated from and was authored and controlled by the hosting site or application, be it a website, cloud storage, game, media content, social media platform, chat, or messaging platform. Despite end users independently sharing content over many of said sites, apps, and networks, the security was hosted and controlled by the central site, acting as a hub and spoke. Peer-to-peer trust and security, as defined, authored, and controlled by the peers (as opposed to a central website or asset/resource host) has thus remained elusive and the subject of "alternate" networks, channels or secret methods offline from the general online milieu. Users could only establish trust of the other peer user(s) or enforce access to their shared content through permissions and mechanisms, both unique to (isolated) and under the guise of the central site, app platform, or network itself, such as Facebook® or Dropbox®. Users presently share over 50 billion pieces of content per day on mobile devices, peer-to-peer, without any such individual trust, control, or capabilities.

This reality has left a missing area in existing systems with respect to end user peer authenticity validation and content control over assets and information, in which users independently share between or among third party sites, apps, and networks. In addition, user-authored tools and techniques to construct, apply, and enforce said security amongst their assets and peers have been wholly absent from the prior solution due to three primary reasons. First, the hosting sites, apps, and networks hold a commercial interest in maintaining sole control over the end user security, identity, privacy (or lack thereof), encryption, and authenticity in so much that their commercial purposes and competitive advantage are being served. Second, these site, app, and network security tools are typically limited to the platform in question and generally do not transcend particular platforms, as end users do themselves during the normal course of their digital lifecycle. Third, such walled-garden authentication tools serve primarily to verify the end user only to the platform itself, thereby causing the site to proxy that trust to other users and other content without distinct and individual user control, configuration management, application, obfuscation, and repudiation of said credentials and contexts.

Existing digital identity solutions, secure messaging apps, and account-based platforms (e.g., social networks, cloud storage, email, voice calls, and secure or encrypted messaging) force the sending user to trust the interim platform identity mechanism without tools or any options to assert, interrogate, or increase the trust rigor on a peer-to-peer, one-to-one, or one to many basis. The sender must simply take the cloud's word for it when it comes to trusting his or her crowd on the other side of the channel. The sender must also relinquish all control over content sharing to the cloud in terms of delivery, verification of the accessor (the person accessing the system), and what happens to the content once it has left the sender device or platform walled garden, such as revocation and modification after the fact. Once again, the sender has no tools or methods at their disposal to enforce real-time, granular controls over who, what, where, when and how content is accessed and shared on a peer-to-peer basis or even monetize the access to that content over any channel. The majority of hacks, breaches, and digital crimes fall into exactly these two categories: user-to-user trust at third party sites, platforms and payments, and the account takeover to access and illicitly share content, whether it be hacked, stolen, or posted on the Internet without the author's or sender's permission (e.g., Sony). It is never the case that the perpetrator presents invalid credentials to breach and access the content or trust. In fact, it is most often the stolen but proper credentials that are used in the wrong context, but that the primary platform cannot discern and protect. As a result the valid end user or content owner is left without tools or notification to protect himself or herself and his or her assets in these instances.

Finally, the current approach to authentication security and content control as covered by traditional measures (shared secrets, device recognition, location, biometrics, tokens, out-of-band, one-time-passwords, key-based encryption) are too linear, cumbersome, costly, unscalable, and uncreative to serve the needs of a contemporary, omni-channel, and user-driven approach to customize trust and security. These security measures have failed to produce a fully interactive, private, user-controlled approach to peer-to-peer trust and peer-to-peer sharing of assets and information, either by value or reference, across existing public and private networks, devices, sites, applications and platforms. These security authentication measures also have failed to provide a solution of this caliber that does not require physical installation of tokens, certificates, or credentials on one or more mobile devices whose counterpart lives in the host or website database for the purposes of establishing user or device identity and the keys for asset integrity, encryption/decryption. The way to overcome this dearth of innovation is to craft an autonomous and interactive system and method that provides crowd, versus cloud, control over identity, privacy, authenticity, and content.

The first challenge is to design a system where users can simply and easily identify and independently authenticate other peer users across public networks, over and above the assumed identity and authenticity offered by the interim platform in the form of an account name, account ID, or other hosted security components the user must trust implicitly. Outside of that patronized channel or device, the user must be able to triangulate and impose their own requirements of rigor in order to validate the user against his or her identity, location, device, action(s), knowledge, or a combination thereof, against fixed or dynamic thresholds. They must be able to do this mutually, synchronously, asynchronously, and across disparate networks, platforms, devices, and contexts.

The second challenge is to design a system where users can independently control and natively monetize content shared with other users across any device, network or platform, regardless of the content asset type, location, duplication, transmission or format, and regardless of its ownership or hosting status—in terms of content by reference (a link) or by value (an attachment). Current authentication measures generally cover control of said content at the vendor level in bespoke or proprietary walled gardens, such as Facebook®, Instagram®, WhatsApp®, Box®, Dropbox®, or other custom silos where rules are enforced at the point of local access, according to those platform's rules. Despite owning the hosted or shared content, users are capable of only manipulating those rules and monitoring the enforcement, rather than, authoring or controlling them, regardless of the hosting platform or network. The goal is to treat monetization just like any other security factor that must be holistically "passed" in context in order to achieve access. In addition, the nature of the payments between peers must reflect the privacy, freedom, and individuality of the share control itself, thus avoiding the platform control, permission or fees related to such transactions made between peers. This would result in saving up to thirty percent of in-app fees for P2P content monetization transactions without having that revenue shared with platform. The challenge also involves both independent encryption and reverse proxy methods, both of which put the power to control and revoke in the hand of the users and blind the hackers' interim plumbing with respect to the source origin and content of the shares as well as its authors or lineage.

The third challenge is to design a system where users can ideally merge the concepts of user authentication, share or asset authentication/control, and monetization into a single, combined, contextual event—with individual, real-time control regardless of the interim channels. No share or asset is considered independent (and therefore accessible) outside of the event of access by a user(s) in a particular context. In short, assets should be protected in contextual motion (during access) rather than at static rest. Balancing security in favor of this user+share authentication context generally increases protection and customization while reducing persistence and predictability, along with a host of other techniques that sidestep the liabilities, cost, complexity, lack of scalability, risk, and management of traditional multi-factor or file encryption methods.

The fourth challenge is to design a system that preferably contextualizes all possible security factors into a dynamic, dependent, and interactive context, as opposed to mere validation of static stored, linear, or sequential credentials. The ideal trust context would preferably comprise: a) one or more devices and their unique properties, presence, and performance; b) location and proximity measurements according to individual or composite perspectives of the sender, recipient, device and invention service; c) the voluntary or involuntary behavior of the user and his or her device(s), such as touch, gesture, motion, orientation, biometrics, sound, vision, etc.; d) knowledge or secret data information, whether challenged and responded, shared, and/or self-authentication for derived/algorithmic; e) the ability to time, trigger, or revoke the trust or content access based on fixed, relative, or dynamic criteria; and f) the ability to conduct direct, peer-to-peer electronic payments between senders and recipients, as criteria for optional user access are programmatically treated like any other security test. A combination or isolation of one, several, or all of these factors, in a particular context, would be required to simultaneously and interdependently authenticate the share asset and its user access, together. Ideally, these contexts are peer-to-peer authored and enforced, rather than centrally managed by the shared host, website, or federated identity system outside of the invention, disclosed herein. Also, ideally, the mechanisms for validating authentication, decrypting assets, or monetizing access are neither: (1) stored on the device or social/messaging network platform nor (2) transmitted as key-value pairs over the network during any portion of the transaction.

The fifth and final challenge is to design a system that preferably maintains the end-user privacy and utmost control (at a peer-to-peer level) through all of these mechanisms, offering the ultimate freedom to trust, share, secure, and monetize the peers and content without fear of hacks, compromise, privacy invasion, or reprisal. By creating an intelligent system of access, denial, assertion and even validation, the sender, receiver, and assets would remain secure and private, both physically and cognitively. It also requires systemic protection from privacy exposure with commensurate assurances the security in question is offline from the asset and platform in terms of independence and anonymity.

Current peer trust and content security measures fail to offer a solution that covers the unique present system without the following traditional pitfalls of: a) relying on stored value tokens, cookies, or certificates (e.g., pretty-good-privacy (PGP)) to pre-bake user endpoints and devices as trusted participants; b) relying on key, shared-secret, or identity-based encryption between peers that must be authored, stored, or shared with the hosting messaging channels or networks themselves; c) reliance on third-party transmission of out-of-band or one-time passwords or tokens; d) naive federation of trust among different vendor systems outside the user control, thus offering a single point of repeatable failure; e) a cumbersome local storage of keys and encryption tools to simply "obfuscate" the validation or protection in terms of mathematical indirection versus true, derived, and universally unique authentication; f) complete obviation of cross-context user control over their security, trust, content, and privacy in deference to the moonlighting or federated hosting site, server, or issued credentials; g) lack of independent user or peer authorship, participation, and ownership of the security process; h) lack of capabilities to support user or peer maintenance or enforcement of their own privacy and integrity across disparate communication channels and platforms; and i) a lack of support for both synchronous or asynchronous enforcement of authentication and asset control.

Current end-to-end encryption systems for content control implemented by DropBox®, Whisper®, WhatsApp® and Telegram® also fail to serve the need by retaining central and platform-specific control of the encryption and identity permissions to unroll and access the encrypted share content without individual and independent power over those elements by the end users themselves. All systems before the current system fail to reverse-proxy (hide the source origin) of content once accessed, making unsecured duplication and illicit transmission of said content to other unauthorized users a trivial exercise. The primary owner/sender of the shared content has no ability to rescind, revoke, or retrieve the content beyond the initial sharing platform plumbing. These systems also require users to leave their current messaging or social channels and "join" another secret channel. This switching mandate creates friction and fracturing of the already existing lines of connection and communication. The ideal solution would work over any existing social or messaging channel, eschewing the need to switch platforms, identities, or applications to conduct secure, controlled, and monetized sharing.

Current content-monetization platforms deny peer-to-peer implementation where one user shares and monetizes content directly with another user, irrespective of the platform or their commerce capabilities and fees. Only command-and-control style content monetization, driven by ads or platform-specific in-app purchases, and subsidized by huge platform fees upwards of thirty percent of the transaction, is presently supported by the major social and messaging networks. This traditional approach has stifled the potential growth of monetizing shared social and personal content and denied the portability of peers to transact privately and profitably across any communication or messaging channel.

There are various examples of inferior authentication, content protection, and monetization measures, and inadequate historical as well as contemporary embodiments of solutions in this invention area, all of which will be detailed and contrasted in the balance of this application.

The following table includes a representative selection of references that are: (1) relevant to the present system; (2) inferior to the present system; (3) have significant deficiencies; and (4) fail to solve the problems addressed above that are solved by the present system, which is described below.

deficiencies in the systems currently available. The embodiments in the present disclosure preferably solves these deficiencies and generally represents a new and useful innovation in the space of independent and interactive peer-to-peer authentication and content protection and monetization across all mobile networks, platforms and devices.

SUMMARY OF EMBODIMENTS

To minimize the limitations in the prior art, and to minimize other limitations that will become apparent upon reading and understanding the embodiments, the present specification discloses a new and useful peer-to-peer mobile context and content authentication system and method.

The embodiments disclosed herein are preferably designed to offer an innovative, applicable, and practical way for peer mobile users to authenticate each other directly across networks and platforms, as a method for independently trusting and verifying their identities and authentication contexts, over and above the underlying device or platform capabilities, or control in doing so, or lack thereof. Secondly, these embodiments offer an innovative and interactive extension to that assertion of trust to control and optionally monetize any content shared by those peers across homogenous or heterogeneous platforms or channels in real-time, without permission, custody, or reliance upon the platforms and their underlying identity or security mechanisms.

One embodiment may be a computer-aided method for peer asset authentication and asset control, the steps comprising: providing a server application; prompting a user to select a share on a first computing device, such that a selected share is created; prompting the user to configure the selected share with one or more authentication factors on the first computing device, such that a configured and selected share is created; receiving the configured and selected share from the first computing device by the server application; returning a secured share link to the first computing device; sharing the secured share link with one or more second computing devices of one or more recipients via one or more

| Pat. No. | Title | Inventor(s) |
| --- | --- | --- |
| US 20140129953 A1 | Apparatus and method for single action control of social network profile access | Spiegel |
| U.S. Pat. No. 9,237,202 B1 | Content delivery network for ephemeral objects | Sehn |
| U.S. Pat. No. 8,909,725 B1 | Content delivery network for ephemeral objects | Sehn |
| U.S. Pat. No. 8,428,453 B1 | Single mode visual media capture | Spiegel, Murphy |
| U.S. Pat. No. 9,251,370 B2 | Personal content control on media device using mobile user device | Kowalik, Wielgus |
| U.S. Pat. No. 8,423,409 B2 | System and method for monetizing user-generated web content | Rao |
| US 20090132341 A1 | Method and System for Monetizing User-Generated Content | Klinger, Wada |
| EP 2887246 A1 | Method to share content with an untrusted device | Jiang, Valverde |
| U.S. Pat. No. 9,294,485 B2 | Controlling access to shared content in an online content management system | Allain, Subrahami |
| U.S. Pat. No. 8,904,480 B2 | Social authentication of users | Castro, Topkara |
| U.S. Pat. No. 7,003,117 B2 | Identity-based encryption system for secure data distribution | Kacker, Appenzeller, Pauker, Spies |

Thus, based on the foregoing, a need exists for a peer-based authentication and content control system and method for providing the same. The peer-based authentication and content control system and method preferably overcome the electronic transmissions; accepting by the server application one or more authentication engagements by the one or more recipients to determine if one or more recipients are authenticated to have access to the configured and selected share in the secured share link; comparing the one or more authentication engagements to the one or more authentication factors by the server application; and providing an access to the configured and selected share to the one or more recipients whose the one or more authentication engagements match up with the one or more authentication factors, the access provided on the one or more second computing devices. The one or more recipients having valid access to the configured and selected share may have access for a set duration of time. The authentication factors may be selected from the group of authentication factors consisting of: device, location, time, behavior, knowledge, and monetization. The one or more authentication factors may comprise a monetization factor, which may comprise one or more valid peer electronic payments from the one or more recipients to the user in an amount specified by the user. The share may be selected from the group of shares consisting of: a data file, an image, a textual content, an audio file, an audio stream, a video file, a video stream, an encrypted file, a hyperlink, and a chat stream. The share may be selected remotely on the first computing device. The one or more electronic transmissions may be selected from the group of electronic transmissions consisting of: a social network platform, a social media, a text message, an instant message platform, an email, a hyperlink, a content stream, an intranet, an Internet, and an interactive chat. The secured share link may be shared to one or more recipients by reverse proxy to hide a source location of the secured share link. The method may further comprise the steps: notifying the user when any of the one or more recipients successfully accesses the configured and selected share. The method may further comprise the step of: accepting one or more valid peer electronic payments made by the one or more recipients; wherein the access may only be granted if the one or more valid peer electronic payments are made and if the one or more authentication engagements match up with the one or more authentication factors. The configured and selected share may be encrypted. The secured share link may be configured to only be accessible by the one or more recipients via a synchronicity, such that at least two of the one or more recipients are required by the server application be mutually and synchronously engaged with the secured share link. At least one element of synchronicity may be selected from the elements consisting of: time, location, proximity, sequence, and other relational parameters. The secured share link may be configured to only be accessible by the one or more recipients via a synchronicity, such that at least one of the one or more recipients and the user are required by the server application be mutually and synchronously engaged with the secured share link. At least one element of synchronicity may be selected from the elements consisting of: time, location, proximity, sequence, and other relational parameters. The method may further comprise the step: monitoring, such that the user tracks or is notified of the one or more authentication engagements by the one or more recipients. The monitoring step may allow the user to override the one or more authentication factors, such that the user is able to allow or deny access to the share to the one or more recipients in real-time. The user share may be authored by the user. The sharing of the secured share link with the one or more recipients may be revoked by the user.

Another embodiment may be a computer-aided method for peer asset authentication and asset control, the steps comprising: providing a server application; prompting a user to select a share on a first computing device, such that a selected share is created; prompting the user to configure the selected share with one or more authentication factors on the first computing device, such that a configured and selected share is created; receiving the configured and selected share from the first computing device by the server application; returning a secured share link to the first computing device; sharing the secured share link with one or more second computing devices of one or more recipients via one or more electronic transmissions; accepting by the server application one or more authentication engagements by the one or more recipients to determine if one or more recipients are authenticated to have access to the configured and selected share in the secured share link; comparing the one or more authentication engagements to the one or more authentication factors by the server application; providing an access to the configured and selected share to the one or more recipients whose the one or more authentication engagements match up with the one or more authentication factors, the access provided on the one or more second computing devices; and notifying the user regarding whether any of the one or more recipients successfully accessed the configured and selected share; wherein the one or more recipients having valid access to the configured and selected share may have access for a set duration of time; wherein the one or more authentication factors may comprise a monetization factor, which may comprise one or more valid peer electronic payments from the one or more recipients to the user in an amount specified by the user; wherein the secured share link may be shared to one or more recipients by reverse proxy to hide a source location of the secured share link; wherein the access may only be granted if the one or more valid peer electronic payments are made and if the one or more authentication engagements match up with the one or more authentication factors; and wherein the configured and selected share may be encrypted.

Another embodiment may be a computer-aided method for peer asset authentication and asset control, the steps comprising: providing a server application; providing one or more shares; prompting a user to select one of the one or more shares, such that a selected share is created; configuring by the user the selected share with one or more authentication factors on a first computing device, such that a configured and selected share is created; submitting the configured and selected share from the first computing device to the server application; returning a secured share link to the first mobile computing device; sharing the secured share link with one or more second computing devices of one or more recipients via one or more electronic transmissions; accepting by the server application one or more authentication engagements by the one or more recipients to determine if one or more recipients are authenticated to have access to the configured and selected share in the secured share link; comparing the one or more authentication engagements to the one or more authentication factors by the server application; and providing an access to the configured and selected share to the one or more recipients whose the one or more authentication engagements match up with the one or more authentication factors, the access provided on the one or more second computing devices. The one or more recipients having valid access to the configured and selected share may have access for a set duration of time. The authentication factors may be selected from the group of authentication factors consisting of: device, location, time, behavior, knowledge, and monetization. The one or more authentication factors may comprise a monetization factor, which may comprise one or more valid peer electronic payments from the one or more recipients to the user in an amount specified by the user. The share may be selected from the group of shares consisting of: a data file, an image, a textual content, an audio file, an audio stream, a video file, a video stream, an encrypted file, a hyperlink, and a chat stream. The share may be selected remotely on the first computing device. The one or more electronic transmissions may be selected from the group of electronic transmissions consisting of: a social network platform, a social media, a text message, an instant message platform, an email, a hyperlink, a content stream, an intranet, an Internet, and an interactive chat. The secured share link may be shared to one or more recipients by reverse proxy to hide a source location of the secured share link. The method may further comprise the steps: notifying the user regarding whether any of the one or more recipients successfully accessed the configured and selected share. The method may further comprise the step of: accepting one or more valid peer electronic payments made by the one or more recipients; wherein the access may be only granted if the one or more valid peer electronic payments are made and if the one or more authentication engagements match up with the one or more authentication factors. The configured and selected share may be encrypted. The secured share link may be configured to only be accessible by the one or more recipients via a synchronicity, such that at least two of the one or more recipients are required by the server application be mutually and synchronously engaged with the secured share link. At least one element of synchronicity may be selected from the elements consisting of: time, location, proximity, sequence, and other relational parameters. The secured share link may be configured to only be accessible by the one or more recipients via a synchronicity, such that at least one of the one or more recipients and the user are required by the server application be mutually and synchronously engaged with the secured share link. At least one element of synchronicity may be selected from the elements consisting of: time, location, proximity, sequence, and other relational parameters. The method may further comprise the step: monitoring, such that the user tracks or is notified of the one or more authentication engagements by the one or more recipients. The monitoring step may allow the user to override the one or more authentication factors, such that the user is able to allow or deny access to the share to the one or more recipients in real-time. The configuring by the user of the selected share with one or more authentication factors on a first computing device, may be done by the user at anytime and in real-time. The sharing of the secured share link with the one or more recipients may be revoked by the user.

Another embodiment may be a computer-aided method for peer asset authentication and asset control, the steps comprising: providing a server application; providing one or more shares; prompting a user to select one of the one or more shares, such that a selected share is created; configuring by the user the selected share with one or more authentication factors on a first computing device, such that a configured and selected share is created; submitting the configured and selected share from the first computing device to the server application; returning a secured share link to the first mobile computing device; sharing the secured share link with one or more second computing devices of one or more recipients via one or more electronic transmissions; accepting by the server application one or more authentication engagements by the one or more recipients to determine if one or more recipients are authenticated to have access to the configured and selected share in the secured share link; comparing the one or more authentication engagements to the one or more authentication factors by the server application; providing an access to the configured and selected share to the one or more recipients whose the one or more authentication engagements match up with the one or more authentication factors, the access provided on the one or more second computing devices; and notifying the user regarding whether any of the one or more recipients successfully accessed the configured and selected share; wherein the one or more recipients having valid access to the configured and selected share have access for a set duration of time; wherein the one or more authentication factors comprise a monetization factor, which comprises one or more valid peer electronic payments from the one or more recipients to the user in an amount specified by the user; wherein the secured share link is shared to one or more recipients by reverse proxy to hide a source location of the secured share link; wherein the access is only granted if the one or more valid peer electronic payments are made and if the one or more authentication engagements match up with the one or more authentication factors; and wherein the configured and selected share is encrypted.

Another embodiment may be a method for peer asset authentication and asset control, the steps comprising: providing a server application; prompting a user to select a share, one or more recipient factors, and one or more recipient authentication requirements on a first mobile computing device; transmitting the share, the one or more recipient factors, and the one or more recipient authentication requirements from the first mobile computing device to the server application; returning a secured share link to the first mobile computing device; prompting the user to provide the secured share link to one or more second mobile computing devices of one or more recipients via one or more electronic transmissions; prompting the one or more recipients to access the secured share link; sending one or more recipient user and secure share file credentials to the server application; processing the secured share link, the one or more recipient authentication requirements by the server application; and providing an access to the share to the one or more second mobile computing devices until the access is invalid. The one or more recipient factors may be one or more recipient security factors. The one or more recipient security factors may comprise a device identity of the one or more recipients. The one or more recipient security factors may comprise a location of the one or more recipients. The one or more recipient security factors may comprise a behavior of the one or more recipients. The one or more recipient security factors may comprise a knowledge of the one or more recipients. The one or more recipient factors may be one or more recipient monetization factors. The one or more recipient monetization factors may comprise a valid peer electronic payment from the one or more recipients to the user in an amount specified by the user. The share may be selected from the group of shares consisting of: a data file, an image, a textual content, an audio file, an audio stream, a video file, a video stream, an encrypted file, a hyperlink, and a chat stream. The share may be selected remotely on the mobile computing device. The one or more electronic means may be selected from the group of electronic transmissions consisting of: a social network post, a text message, an email, a hyperlink, a content stream and an interactive chat. The secured share link may be transmitted to one or more recipients by reverse proxy to hide a source location of the secure share link. The share transmitted to the one or more second mobile computing devices of the one or more recipients may be processed and validated by the server application. The method may further comprise the step of: returning a secure share file to the first mobile security device; prompting the user to provide the secure share file to the one or more second mobile security devices of the one or more recipients via one or more electronic transmissions; and prompting the one or more recipients to access the secure share file. The share may be encrypted. The method for peer asset authentication and asset control may be performed by the user and the recipient synchronously. The method for peer asset authentication and asset control may be performed by the user and the recipient asynchronously. The one or more recipients may be a plurality of recipients; and the method for peer asset authentication may be mutually performed by the plurality of recipients, such that the processing step of the secure share link remains pending until all of the plurality of recipients access the share. The method may further comprise the steps of: accessing the share by the one or more recipients; notifying the user on the first mobile security device of the accessing step by the one or more recipients; and authenticating the one or more recipients on the first mobile security device by the user, such that the user may confirm access of the share to the one or more recipients. The notifying step and the authenticating step may be performed in real-time. The selecting step of the one or more recipient factors for the share may be configured by the user anytime and in real-time. The access to the secure share link by one or more recipients may be revoked by the user in real-time.

It is an object to provide independent contextual trust between and among peers online and within mobile interactions.

It is an object to provide private, independent, and interactive control over any content shared with and among peers over mobile and online networks without permission of or reliance upon the underlying networks, channels, or platforms.

It is an object to allow senders to simply author and/or cut and paste any content, file, link, reference, or asset that the senders wish to securely share by reference or value from and without the sources of those shares and asset repositories.

It is an object to provide senders simple taps to choose powerful security and authentication verification and control over other users and shares using factors such as: device, wearable, location, time, behavior, biometric and knowledge.

It is an object to allow the sender to choose time, frequency, notification, and substitution options to further control, monetize, and revoke the content that the sender shared.

It is an object to transform the share parameters into a secured link or asset for sharing back out by the sender with all share parameters, sender identity, and share content obfuscated and protected from illegal or unauthorized access, interim platform copy/storage/archiving, and exposure.

It is an object to allow senders to simply paste back into any social media, network, or messaging platform the newly secured share for ease of transmission.

It is an object to provide a secured link engaged by a recipient, valid or invalid, such that the secured link will be met with equal authentication, payment prosecution, and validation according to the factors configured by the user for that share.

It is an object to provide an authentication method that allows valid recipient(s) to seamlessly access the desired content.

It is an object to provide the original sender with the option to monetize the shared content for the purposes of providing intended recipients the ability to issue peer-to-peer electronic payments between or amongst themselves as criteria to gain access to the secured shared content.

It is an object to provide the original sender with the option to encrypt, obfuscate, and/or reverse proxy the original secured share asset content, either by reference or by value.

It is an object that an invalid recipient who failed to authenticate will be denied access to the desired content or be provided a noxious substitute asset as a misdirection.

It is an object to provide an optional notification to the original sender of the share when the recipient attempts access of the share and the status therefrom.

It is an object to provide an optional real-time notification and decision-making power to the recipient over a recipient share access attempt, either pass for fail, with overriding or canceling permission control.

It is an object to provide the sender an option for real-time control over parameter reconfiguration or outright share access revocation in real-time for one, several, or all recipients.

It is an object that: (1) said validation, (2) access control and validation, (3) notification, and (4) permission management occur at a peer-to-peer level without: (i) interim platform or channel awareness, (ii) interaction, (iii) filtering, control, (iv) archiving, or (v) interference.

It is an object that said sharing and validation among peers be permissible at a one to one, one to many, or many-to-many levels, with both synchronous, asynchronous, and mutual variations supported.

It is an object that both senders and recipients may be on the same or different device types, networks, or platforms.

It is an object that both senders and recipients may remain anonymous and abstracted from the share context authentication in terms of identity, history, or participation.

It is an object that the share content may be shared across mediums such as emails, SMS, social postings, chat logs, HTML links, and instant messages with the security, trust, privacy, and control remaining intact.

It is an object that the concept of security and authenticity at a peer level be synonymous with the user and the share as a single context versus a serialized, sequential, or separated/isolated approach.

It is an object that all contextual authentication is bespoke, interactive, and real-time without relying stored factors such as tokens, cookies, passwords, dongles, OOB/OTP values, SSOs, digital certificates, PGP, browser profiles, key stores, transmitted key-value pairs, password lockers, PUF technology, and involuntary biometrics.

It is an object to be simple, mobile, and globally scalable with simple language-agnostic tap engagement, cut and paste interaction, without requiring plugins, APIs, programming or platform-specific configuration.

It is an object to provide a new, novel system and method that offers a superior solution in the field, science, and area of electronic authentication.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Figure 1:
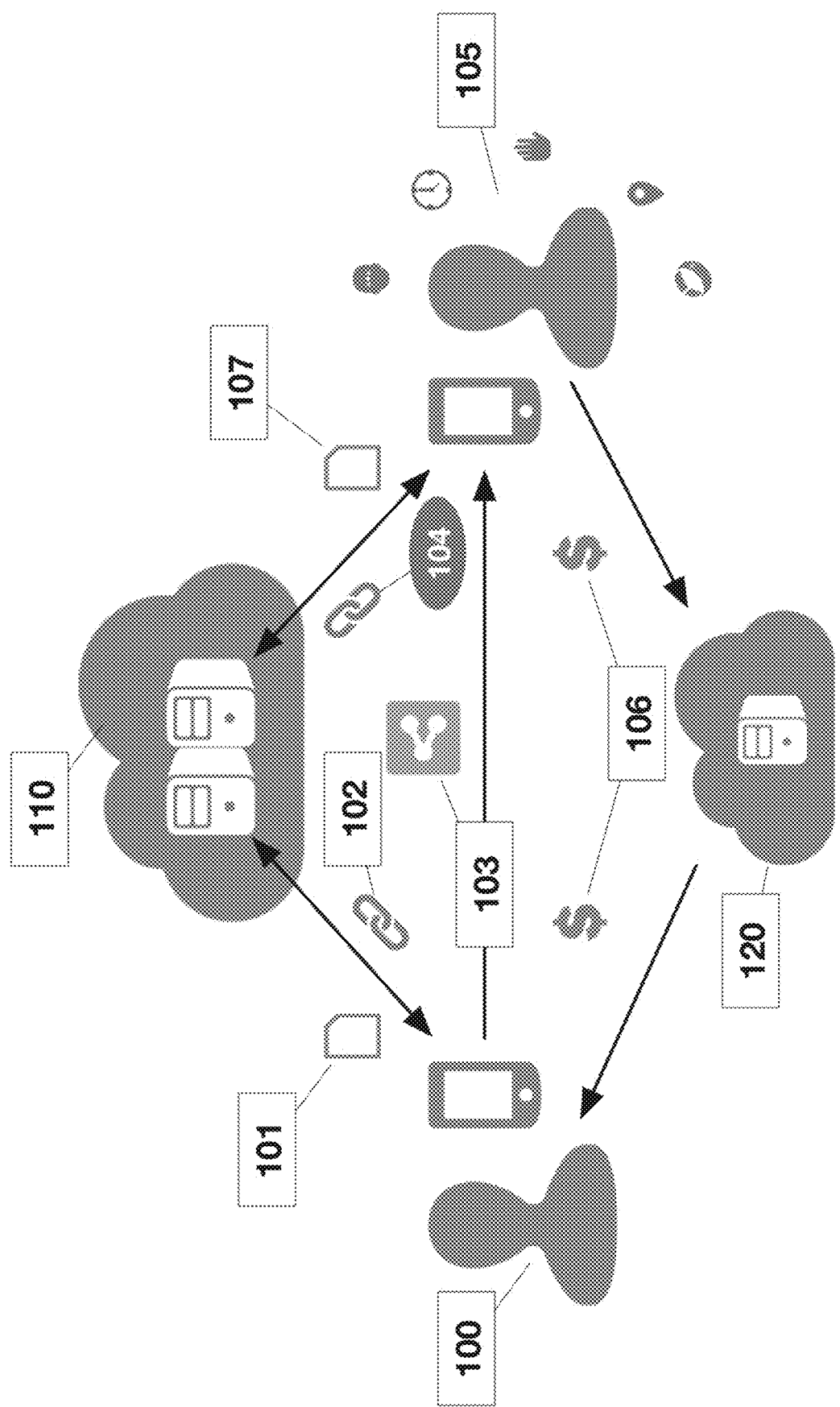
FIG. 1 is an illustration of one embodiment of the system for mobile peer authentication and asset control and shows the primary components and general flow of the system, which includes the sender securing and monetizing from their mobile computing device, the share, the recipient from accessing from their mobile computing device, the (optional) transmission network, and the system service in context.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still other will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of the embodiments disclosed herein. For instance, the terms "computer", "computer system", "computing device", mobile computing device", "electronic data processing unit", or "server" refer to any device that processes information with an integrated circuit chip, including without limitation, personal computers, mainframe computers, workstations, servers, desktop computers, portable computers, laptop computers, embedded computers, wireless devices, including cellular phones, personal digital assistants, tablets, tablet computers, smart phones, portable game players, wearables, smart devices and hand-held computers.

As used herein, the term "Internet" refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof.

As used herein, the term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

The term "sender" refers to the valid author or transmitting user of a secured share, asset, file, content, or resource from his or her mobile computing device. The sender may: (1) configure the asset and its security or payment factors; (2) choose the control parameters, including location, behavior, synchronicity, lifespan, and target recipients; and (3) select the method or mode of transmission.

The term "recipient" refers to the valid receiver or engaging user or purchaser of a securely shared asset, file, content, or resource from his or her mobile computing device. The recipient may access a share on their device from any possible engagement channel and is authenticated by the embodiments disclosed herein, according to their local and share global policies. The recipient may: (1) be allowed or denied access to the share source content or asset based on passage or failure to authenticate in context or fulfill configured payment, or (2) be the subject of sender revocation. The recipient can, in turn, become his or her own sender of the same or a new share from his or her mobile device. There may be one or more recipients.

The term "factor", "factors", or "authentication factors" refers to any situations, factors, or events including multi-mass factors, during the main authentication session, including without limitation, personalized authentication context factors or personal factors (e.g., location factors, behavioral factors, custom factors, proximity factors); elements or factors of the session context in the perspective of the server (e.g., host server, link/code object presentation location, user, device, location, time, any supplied credentials or cloud-stored algorithms about the user behavior, attributes or history); elements of the session context in the perspective of the device (e.g., elements of the website, server, device itself, user, and session); behavioral actions of the user (e.g., facing north, orienting the mobile in portrait mode or executing a gesture, or "exist" within certain location or proximity attributes such as nearness to the server display screen or another device or fixed location point); and external factors such as one or more of an out-of-band personal identification numbers (PIN), passphrase, shared secret data, one-time-password or reused password, delivered via email, short message service (SMS), multimedia service (MMS), voice, physical token, electronic payments or other serviceoriented interfaces, events, or actions or other human or computer mediated transmission outside of the user channel, host channel, and smart channel.

The terms "share", "asset", and "shared asset" refer to a hyperlink, file, document, image, sound, or video file, stream, payment, access event, download, direction, communication, message, tweet, post, email, short code, app, or game event, or other electronic event capable of being authored, saved, stored, hosted, referenced, downloaded, transmitted and accessed, consumed, opened, or otherwise engaged from a computing device according to the steps of the method disclosed herein.

The terms "secured share" and "secured asset" refer to a hyperlink or file that offers abstraction, indirection, or encrypted protection from the original or underlying protected source file, link, or asset and is used to transmit from sender to user in lieu of the original asset. The secured share or link invoke processing when clicked or tapped on a mobile computing device, either remotely or locally, for purposes of allowing or denying access according to the share and user context via security, authentication, or monetization policies.

The term "reverse proxy" refers to any mechanism, which obfuscates the source origin of an asset, share, policy, payment, or access from the original sender or transmission to one or more recipients. The concept may more specifically refer to the network principle of proxying the transmission of the accessed/unsecured original asset, as it is downloaded or retrieved from its source of origin by the validated and permitted recipient. The purpose of reverse-proxy is preferably to prevent the recipient from knowing how or where to access the asset outside of the secured mechanisms and/or sharing that source location with other unintended recipients who could potentially access the share without authentication, validation, or payment.

The term "encryption" refers to a cryptographic method to secure and obfuscate the source asset in situ, whether remotely or locally, through processing via cypher for which there is a key or mechanism to decipher upon assumed permission (authentication, validation, payment) and access to the deciphering keys. Unlike "reverse proxy", which protects assets only as remote instances across a network, encryption adds the ability to control and enforce access to assets both remotely and locally on mobile computing devices through enforcement of permissions and keys.

The terms "monetized share" and "monetization" refer to the application of payment factors (e.g., price, subscription, donation, none) to a secured share for the purposes of requiring an electronic payment of a certain amount or frequency from the recipient to the sender (directly, i.e. peer-to-peer) to gain either one-time or ongoing access to the secured share. Just as with security factors, payment factors may be applied in real-time for all access to secured shares and must be current, valid, and fulfilled to provide ongoing access. Also, just as with security factors, they may be modified, reconfigured, or revoked by the sender at any time.

The terms "payment" and "peer electronic payment" refer to any mechanism by which a user may issue an electronic payment from their mobile computing device to another user upon the catalyst of accessing a secured share. Such mechanisms may be internal, external, referenced, native, 3rd-party, public, private, bespoke, or related to the interim messaging or transmission platform, such as Facebook® Messenger Payments, PayPal®, ApplePay®, Samsung-Pay®, Bitcoin®, Shill®, Stripe® or Square® or any other suitable peer-to-peer mobile electronic payment mechanism.

The terms "host" and "platform" refer to any computer network, platform, website or app infrastructure for public or private registration, connection, communication, hosting, sharing, streaming, access or presentation/publication of content, messages, information, data, files, streams, media, documents, or computer code by users accessing from either fixed or mobile computing devices. Examples of such "hosts" or platforms may include, but are not limited to: popular networks such as Facebook®, Instagram®, Yahoo®, Twitter®, Dropbox®, Box®, Evernote®, Apple® iCloud®, Google Cloud®, Microsoft® OneDrive®, Skype®, public email, text messaging, a web server, an app server, a mobile apps, wearable platforms, local networks and storage, chat or instant messaging.

The term "device context" refers to (1) any mobile and/or cloud measurement of the unique identity or presence of the recipients mobile computing device(s), computed a number of ways, or (2) the presence of multiple or alternate devices such as a wearable, timepiece, tablet, desktop computer, media or gaming device, vehicle, building or structure, automation/security, robot, or primary or secondary devices held, operated or provided by another user.

The term "location context" refers to any mobile and/or cloud measurement of absolute, range-based, or proximal computation of location according to a fixed reference point of the sender, asset, recipient, or other fixed and provided location, a location range, or tolerance, or relative proximity of the recipient(s) or share(s) to a fixed or moving target such as another user, the sender at the time, a device, or device(s), geographic points, points of interest, businesses, merchandise, vehicles, or proximity thresholds or tolerances to multiple user locations in synchronous or asynchronous mode.

The term "behavior context" refers to any mobile and/or cloud measurement of the recipients voluntary or involuntary behavior, biometrics, touch, motion, gesture, gait, impact, sound, visual or audible focus, stimulus/response, selection, psychological, or biological event that can be discerned in context of the share or asset access on a mobile computing device.

The term "knowledge context" refers to any mobile and/or cloud measurement of the recipient's knowledge, inference, challenge/response, emotion, selection, choice or expression of information, either stored/shared or self-authenticating, which can be discretely identified and computed in terms of overall cognitive context. Ideally, this takes the form of textual, sonic, visual, touch, motion, gesture, visual/audible, motion, action or inaction responses to stimuli, or completely voluntary to express the knowledge for contextual measurement.

The term "time context" refers to any mobile and/or cloud measurement of the notion of time, absolute or relative, time passing, triggers or catalysts, concurrency, chain of custody or real-time status (allow, revoke) with respect to the active lifespan of a share, its security or monetization policies, access or revocation, or any other aspect that may be time bound, constrained, influenced, or affected.

The term "authentication context" refers to a holistic view of all above contexts as a single concept of interdependence, according to share rules, without capabilities, awareness, or meaning outside of the others. Devices, location, behavior, time, and knowledge, as configured, may be corporately verified without interim challenge-response steps or computation to complete a holistic context for verification. This is what separates it from traditional multi-factor or shared-secret approaches.

The terms "wearable device", "internet of things device", or "IOT device" refer to any computing device other than the sender's or receiver's primary mobile computing device. This device may be used as an additional device factor, queried, engaged, interacted with, or merely asserted for presence, identity, and status. Alternatively, the wearable or TOT device may be a gateway to provide other user, device or factor information for the purposes of context authentication.

The Share, Control and Optional Monetization

FIG. 1 is an illustration of one embodiment of the system for mobile peer authentication and asset control and shows the primary components and general flow of the system, which includes the sender securing and monetizing from their mobile computing device, the share, the recipient from accessing from their mobile computing device, the (optional) transmission network and the invention service in context. As shown in FIG. 1, one embodiment of the system 111 may comprise: an asset or share 101, secured share link 102, and one or more servers 110, 120. FIG. 1 shows that the sender 100 preferably selects, copies, or authors an asset or share 101 to protect or monetize. The sender 100 may also configure the share 101 for protection using various authentication factors (e.g., device, location, behavior, knowledge, time, etc.) and optional peer monetization factors (price to view/access/download) via the server 110 which returns a secured share link 102 or file to be shared over any electronic transmission 103 (e.g., digital social, messaging, mobile, web, storage communication channels) with one more recipients 105. The recipient(s) 105 may tap or engage with the secured share wherever the recipient(s) 105 encounters the electronic transmission 103, and upon doing so, must perform an authentication 104 and/or remediate peer payment 106 to the sender 100 in order to gain access to the share 101. The server 110 preferably validates the authentication 104 of the recipient and payment 106, and upon successful validation, authorization, and optional sender permissions 105, the server 110 returns or optionally decrypts the original source asset 101 for the valid recipient 105 to consume or engage. Subsequent attempts by the valid intended recipient 105 or other recipients 105 are generally met with the same validation or monetization rigor through the servers 110, 120, regardless of secured asset context, transmission or location (local or remote).

Figure 2:
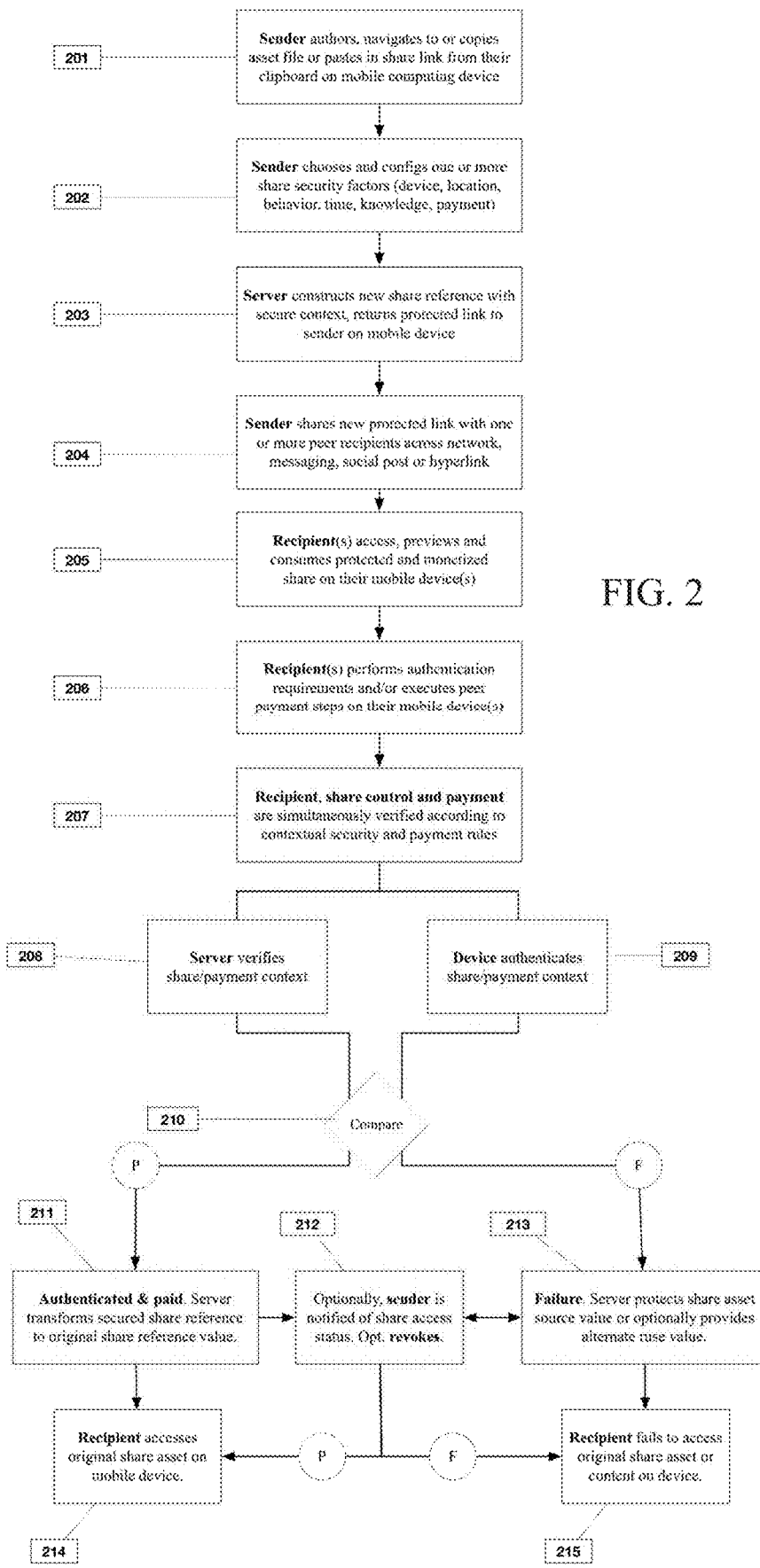
FIG. 2 is a flow chart of one embodiment of the method for protected asset creation, protected asset sharing or transmission, protected share access and authentication, recipient passage/failure or misdirection, and sender notification

FIG. 2 is a flow chart of one embodiment of the method for protected asset creation, protected asset sharing or transmission, protected share access and authentication, recipient passage/failure or misdirection and sender notification FIG. 2 outlines the process shown in FIG. 1 and shows the steps 201, 202, 203, 204, 205, 206, 207 of the share creation, configuration and transmission; steps 208, 209, 210 for the validation and secured share access contextual parameters; and steps 211, 212, 213 for the optional sender permission or denial of recipient access. The steps may comprise: sender authors, navigates to or copies asset file or pastes in share link from their clipboard on mobile computing device 201; sender chooses and configures one or more share security factors (device, location, behavior, time, knowledge, payment) 202; server constructs new share reference with secure context, returns protected link to sender on mobile device 203; sender shares new protected link with one or more peer recipients across network, messaging, social post or hyperlink 204; recipient(s) access, previews, and consumes protected and monetized share on their mobile device(s) 205; recipient(s) performs authentication requirements and/or executes peer payment steps on their mobile device(s) 206; recipient, share control, and payment are simultaneously verified according to contextual security and payment rules 207. Regarding the validation, the server verifies share/payment context 208 and the device authenticates share/payment context 209, and these verifications are compared 210. If authentication passes (P), FIG. 2 shows that if authenticated & paid, server transforms secured share reference to original share reference value 211. The recipient accesses original share asset on his/her mobile device 214. Optionally, sender is notified of share access status, which is optionally revoked 212. In the event of failure, either after compare 210 or optional step 212, the server protects share asset source value or optionally provides alternate ruse value 213. In this case the recipient fails to access original share asset or content on device 215.

Figure 3:
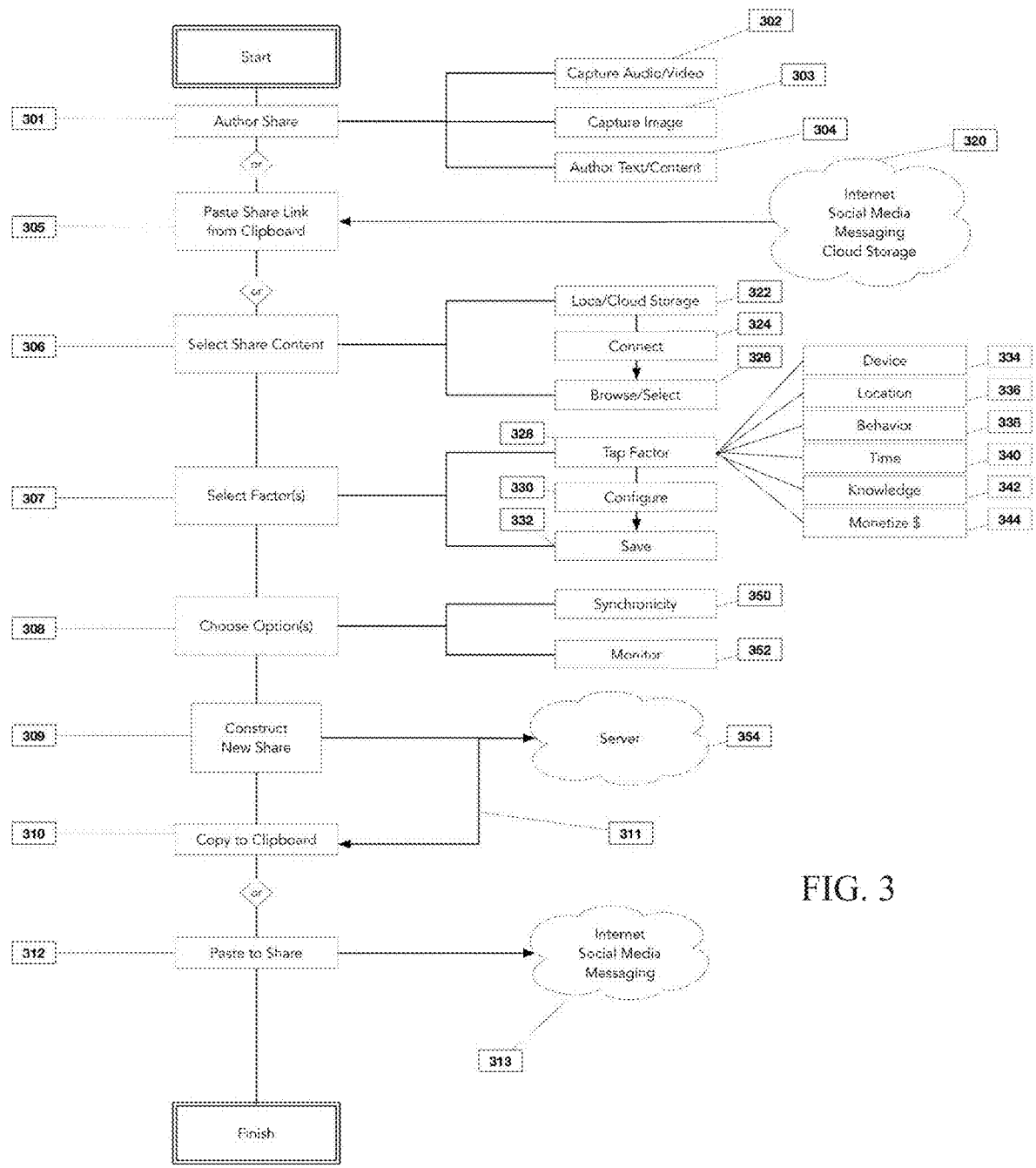
FIG. 3 is a flow chart of one embodiment of the method and shows the sender securing, monetizing, and sharing secured asset/share to a recipient.

FIG. 3 is a flow chart of one embodiment of the method and shows the sender securing, monetizing, and sharing secured asset/share to a recipient. FIG. 3 shows that the author may generate or create a share 301, which may be a video 302, image 303, or other content/text 304. Or, the author/user may select and paste content or share link from a clipboard 305, which may reside in the cloud or cloud storage, the Internet, social media, or other messaging type platform 320. Or, the user may select a share or share content 306, which may be found local or cloud storage 322, by establishing a connection 324, and then browsing and selecting 326.

Specifically in FIG. 3, on a mobile computing device, the sender preferably selects 306 a share, link, or file to share, and the sender may navigate to select the share, copy the share, or its reference into the mobile device clipboard 305 or simply authors the share as a photo, video, textual file or short message including text and other optional links or references to other resources and assets 301, 302, 303, 304.

The sender ideally "taps" 328 the application on the mobile computing device to choose and configure 330 security factors for the share and recipient authentication requirements with parameters, from among device 334, location 336, time 340, behavior 338, knowledge 342, and monetization 344 categories 307. The configured factors may be saved 332.

Preferably, if the sender selects devices 334, the sender may choose a generic enforcement of a recipient mobile or wearable device authenticity or alternatively may specify a specific alternate device such as a smart watch, fitness band, additional mobile device, or tablet device. This device must be valid and proximal to the recipient and their primary computing device in order to access the designated share in context.

Preferably, if the sender selects location 336, they may choose a specific recipient location or a location range, computed and defined as an absolute or proximal value from either the recipient's device at the time of the creation of the share or, alternatively, at the time of the access to the share. Preferably, the actual recipient location parameters as disclosed herein must be valid and within tolerance at the time of share context validation in order to allow recipient access to the share.

Preferably, if the sender selects behavior 338, the sender may choose a pattern of behavior that the recipient must perform on his or her mobile computing device, additional wearable, or TOT device, in order to access the share at time of said authentication. The discrete behavioral pattern is ideally voluntary or involuntary from among a single or combination of touch, motion, gesture, orientation, performance, sound, visual, or other measurable event or events either defined or captured by the mobile computing device. Alternatively, the sender may generically choose behavior, without knowledge to specifics, thus enforcing the recipient to perform or produce whatever behavioral or biometric requirements exist on their side of the transaction, device, or account.

Preferably, if the sender selects knowledge 342, the sender may choose a specific textual secret that the recipient must provide at time of share access, on his or her mobile computing device, to access the share successfully. This secret may be mutually known, derived, self-authenticating, delivered out of band, generated as a one-time value, or any other scenario where knowledge secrets can be prompted, captured, and validated on the recipient mobile computing device.

Preferably, the sender may select one or more of these peer factors (or combination thereof) to secure the share. As a result, his or her validation and authentication against the share and recipient at time of share access attempt will accumulate, comprising the holistic user+share authentication context that must be totally valid for successful recipient share access.

Regarding a device 334 context, the sender may tap to require the recipient or share to be on the device registered in order to correct user to access that shared asset, and not an alternate or unknown device.

Regarding a location 336 context, the sender may tap to require the recipient or share be within an absolute or proximal location at the time of access, as determined by the senders current or eventual location (at access), a discrete fixed point relative proximity to some other fixed or moving location, device or event.

Regarding behavior 338 context, the sender may tap to require the recipient to perform a certain behavior, touch, gesture, motion, orientation, sound, speech, biometric, pairing, association, or other stimulus-response event on the mobile device(s) to access the share. This may be a known specific behavior or a self-authenticating behavior not known to the sender, but required to exist and be accurate on the recipient's part upon share access per the recipient's device, account rules, or configuration.

Regarding knowledge 342 context, the sender may tap to require the user to respond to a prompt or challenge with typed, verbal or otherwise value, an out-of-band or one-time-generated value or a self-authenticating value known only to the valid recipient user but required by the sender to be present and accurate or verified for the access to the share.

Optionally 308, in another embodiment, the sender may select and configure to enforce synchronicity 350 in secured asset engagement; thus requiring the one or more recipients, (and perhaps the sender himself/herself) to be mutually and synchronously engaged with the asset as a factor of the content verification. Synchronicity may be based on time, location, proximity, sequence or other relational parameter. Also optionally, in another embodiment, the sender may select and configure the secured asset for event monitoring 352 whereby the sender may track or be notified of access attempts by location, time, or other parameters along with commensurate abilities to allow or deny access to one more recipients in real-time.

Preferably, the primary mobile computing device of the sender and recipient may be configured as the default share access verification factor without requiring a selection or specification by the sender Optionally, the sender may select none, one, several, or all of these security factor types in the context of a share which shall be accumulated for overall context verification on the part of the recipient and their mobile device at share access time. If no factors are chosen, the recipient user may be validated when accessing on their valid and registered device.

In one embodiment, the sender may optionally choose the share timing or lifespan, max share access count, share notification subscription, or other parameters. Share timing or line space determines when a shared asset is accessible, regardless of parameter authentication by anyone, and may be a fixed or relative timescale triggered by share creation, time passage or the occurrence of specific events. Max share access count may be used to determine the maximum times a share may be accessed by one or more users, ranging from never to infinite. Share notification setting may allow the sender to request to subscribe to notifications about share access attempts, identity of recipient and location of attempts and overall status.

In another embodiment, the sender may optionally choose a monetization factor for the secured shared asset, in the form of a payment value (price), duration (one-time, periodic subscription), whether mandatory or optional, and the source of the peer payment destination account.

Sender may also optionally choose a restricted user or user group target for transmission of the share.

The composite share parameters, including source asset metadata and security, payment and user parameters, may be sent from the sender mobile computing device to the server 354 for processing, transformation, and registration of the share.

The server may construct a new secured, obfuscated share asset 309 based on these and the senders native parameters to take place of original content. The server 354 may also store the original parameters on the server and may return the new, mis-directed, protected share link or file to the sender device 311. This protected link or file may replace the original asset value in the sender's clipboard 310 and may provide a new share target by the sender from their clipboard or interface.

In one embodiment, the sender may copy 310 a new secured share 309 back into the original sharing app or may simply share the new secured shared asset directly from this step to the preferred method of transmission to the recipient by reference such as a share link 312 (paste). Methods of re-sharing may include, without limitation, social network posts, email messages, text messages, HTML hyperlinks, posts or interactive chats and content streams 313.

The sender may send a new share out to one or more peers directly from his or her mobile device 312, preferably social network post, text message, email, HTML link, chat session or any form of electronic transmission 313.

In one embodiment, the share may be a file or stored-value message of a certain char length that is encoded/encrypted according to the chosen security context and is sent, retrieved by reverse-proxy and un-encoded/unencrypted in the cloud and mobile device, by value, based on recipient authentication status, as opposed to merely shown/hidden by reference 311.

In this case, the sender may optionally navigate on his or her mobile computing device to select the share, such as a stored or taken photo, email attachment, cloud storage file or asset or other accessible resource. Once selected, the factors and options are selected as per above, but the share may be physically modified, encrypted, or encoded based on those parameters and either attached for share/transmission to the selected medium. Alternatively, the share may be written back to the local or cloud accessible storage to be shared again by reference, but now pointing to the modified and secured source asset 311.

The Access and Optional Payment

Figure 4:
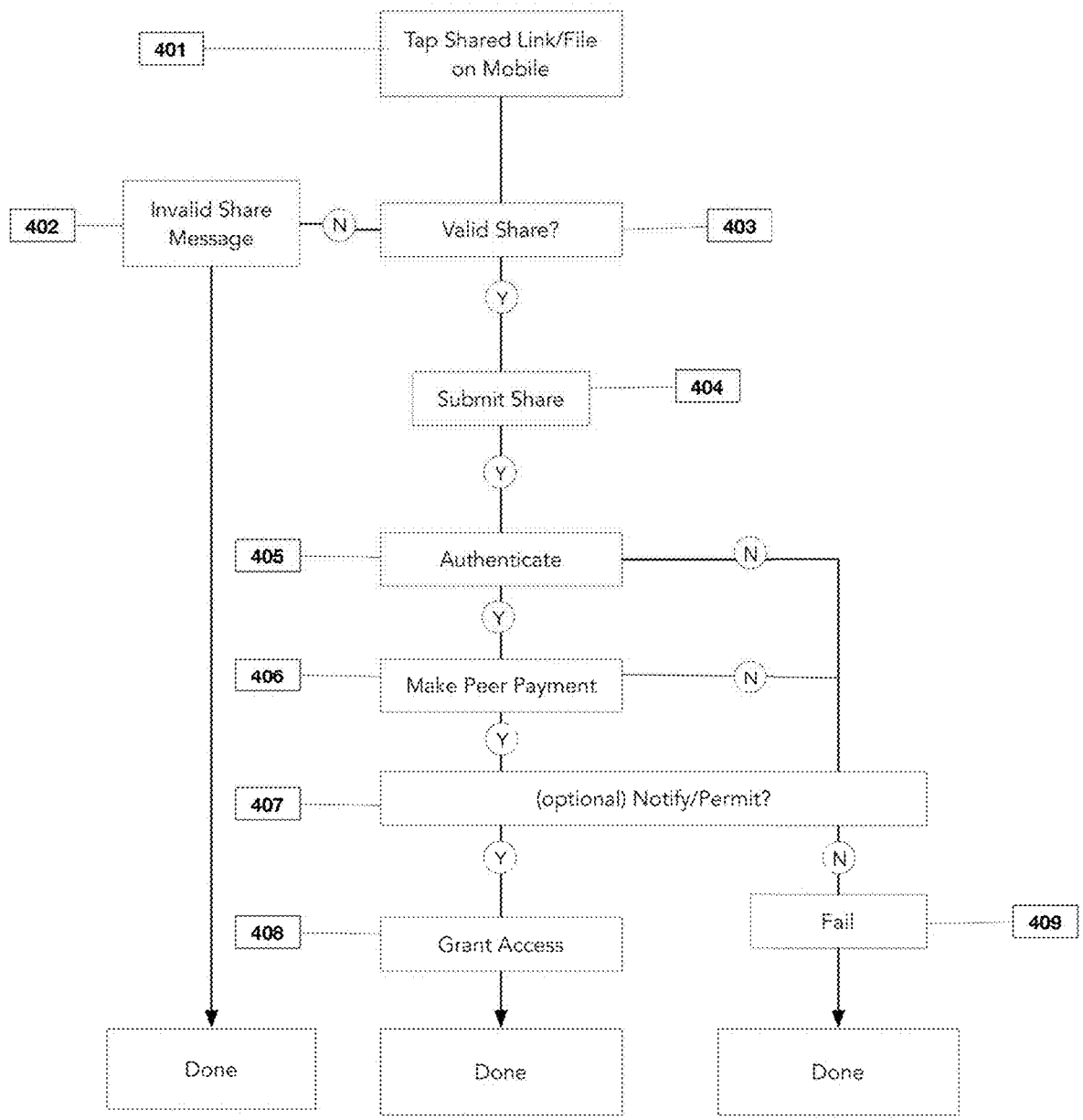
FIG. 4 is a flow chart of one embodiment of the method and shows the recipient securely accessing a secured share initially and remotely.

FIG. 4 is a flow chart of one embodiment of the method and shows the recipient securely accessing a secured share initially and remotely. Specifically, FIG. 4 shows that the recipient may access the secured share link or file, synchronously or asynchronously from the sender share event, from his or her mobile computing device 401. Upon share access, the mobile computing devices may consume the share reference and, as a result, the server may send both the share link or file attributes and the recipient user credentials to the server, for processing according to the stored rules for both.

If the secured share link is invalid or nonexistent, no further processing occurs by the server 402. The recipient simply fails to access the original value, and a notification may be sent to the mobile computing device of the sender. The session ends.

On the other hand, if the share is valid but revoked or passed its access limit (if set), no further processing occurs by the server. The recipient fails to access the original value and a notification may be sent to the mobile computing device. The session ends.

If the share is valid but configured to require synchronous or mutual authentication by several recipients to unlock the common share asset, the share attempt may remain pending until the mutual or synchronous conditions are met. Optionally, the recipients can leave the session and would be notified to re-engage when the balance of joint recipients are present. Optionally, the system may re-poll the recipients at intervals to attempt to assemble them in real-time for mutual access.

In one embodiment, if the share is valid 403, active and other conditions are met, and the server may process both the shared asset and user authentication requirements by referencing them from the identifiers provided at share access time (submit) 404. The server may returns the authentication rigor algorithm to the recipient mobile computing device.

The server and the recipient mobile device may both simultaneously compute the authentication 405 context for both recipient and shared asset as one concept, according to the these categories of factors—devices, location, time, behavior, knowledge and payments 406—attempting to compare and resonate the results. If the authentication context factors require the recipient or ancillary devices to perform or give responses to prompts or behavioral, locational or knowledge-based interrogation, the recipient mobile computing device may perform these functions at this time 405. The system may include a notification that payment has been made or not been made 407.

In one embodiment, the server, from its own independent position and perspective, may perform the same interrogation against the factors and context, such as location, behavior or knowledge detection, proximal device interrogation and the like. If the recipient or his/her device(s) fail to respond (and/or make payment), the session ends and the share is protected 409.

If the recipient and share context is mutually authenticated by both the server and the device, the server may compute and return to the mobile computing device the original, unsecured, or unencrypted asset link for permitted recipient access 408.

In one embodiment, if a monetization factor is set, the recipient may perform the required peer electronic payment 406 via their own account, directly to the sender to gain to the secured shared asset. If the recipient and share context is mutually authenticated by both the server and the invention on the device, and the desired payment is successful processed and validated between recipient and original sender, the server may compute and return to the mobile computing device the original, unsecured, or unencrypted asset link or file via reverse proxy for permitted recipient access. If the monetization factor is one-time in nature, the initial access attempt is all that is bound by the payment factor execution and validation. If the monetization factor is periodic (subscription), then the current status of recipient's subscription payment to the sender and its validity is asserted to provide initial and/or period access permission 408 by the recipient.

Figure 5:
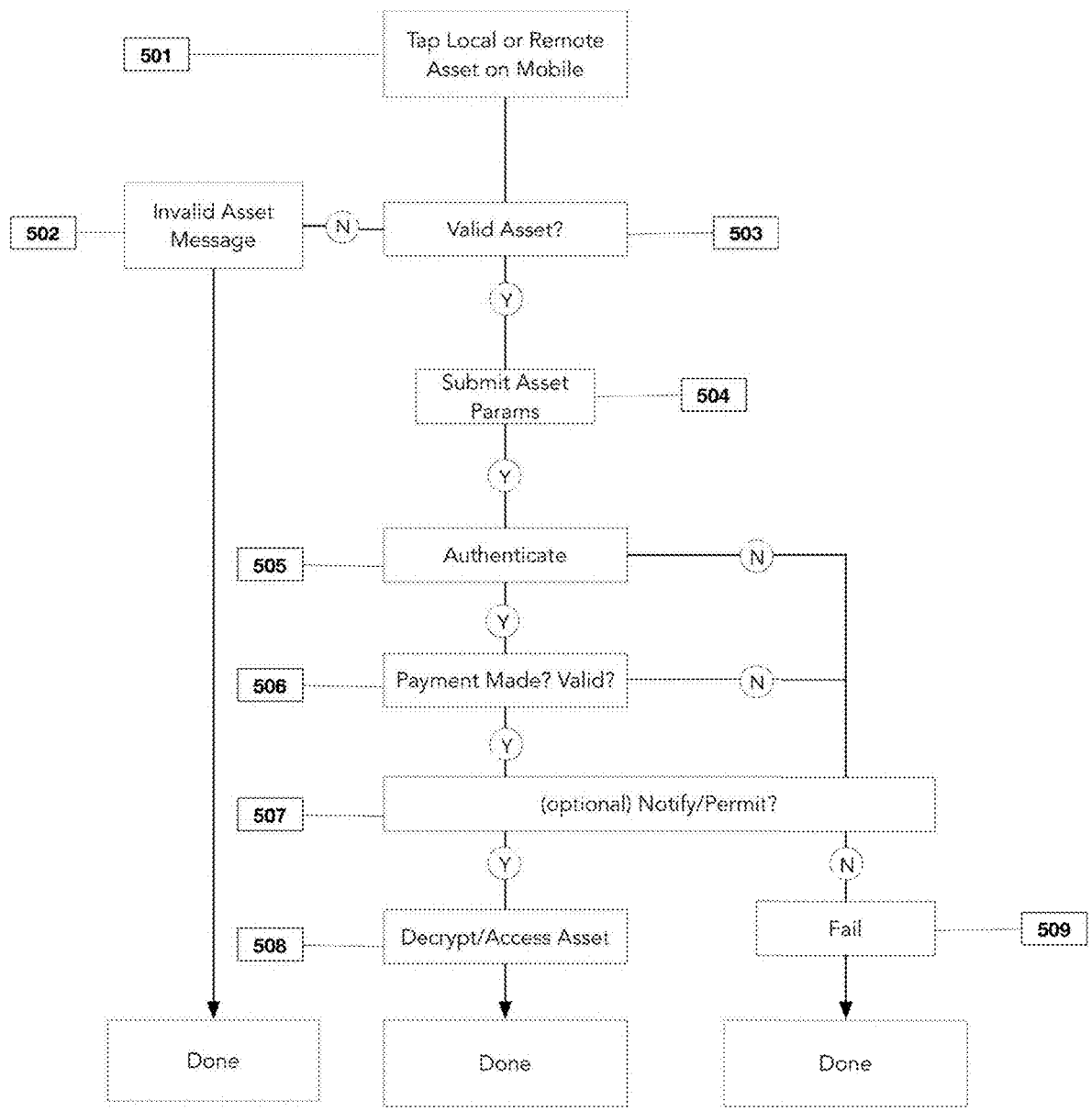
FIG. 5 is a flow chart of one embodiment of the method and shows the recipient securely accessing a secured share locally.

FIG. 5 is a flow chart of one embodiment of the method and shows the recipient securely accessing a secured share locally. As shown in FIG. 5, if the secured share is transmitted by value (file) as opposed to by reference (link), the successfully accessed or monetized share 501 may be transmitted to the recipient's mobile device by reverse proxy as an encrypted file that must be accessed initially and repeatedly upon subsequent requests, as a secured and encrypted asset. Local access must only be granted via remote invention server validation 502, 503, 504, 505, 506, 507, 508, 509 as with the initial access, even though the secured and encrypted asset file has already been delivered. Local access may be permitted, modified, or revoked in real-time by the original sender, just as with remote or initial access, authentication and retrieval.

As shown in FIG. 5, the Tap Local or Remote Asset on Mobile 501, may be determined as a valid asset 503. If the asset is not validated, an invalid asset message 502 is generated and access is not granted. If the asset is valid, the asset parameters are submitted 504. The submitted parameters are authenticated 505. If not authenticated, access fails 509. An optional notification of failure may be generated 507. If authenticated, payment must be made 506. If no payment, access fails 509. An optional notification of failure may be generated 507. If payment is made, the asset is decrypted and/or accessed 508. An optional notification of success may be generated 507.

If either the recipient or the share context fails authentication or optional payment for any reason, the entire authentication may fail 408, 508. The server may deny access to the original share (local or remote), and no further server processing may occur. The server may also inform the recipient of the failure and the sender, and the original content may be protected.

Preferably, in all cases, the sender may know that the recipient is the valid user, can or has performed the required authentication or monetization context, and has control over the asset shared with that recipient, now and in the future. Additionally, invalid recipients may not be able to access the shared content, despite perhaps having control over the recipients device, account or having forwarded or copied the protected share content.

Share, Notification, Modification, and Revocation

In FIG. 4 and FIG. 5, the case of recipient access, success, or failure, the sender may be notified on his or her mobile device of the recipient access attempt and status 407, 507. In this case, the sender may be able to first authenticate that the recipient is the right user on the right device with the right location, timing, payment, behavior and knowledge. Second, the sender may granularly protect the shared content in real time, over and above simply trusting the user simplicity and eternally with the share or shares sent 407, 507.

Figure 6:
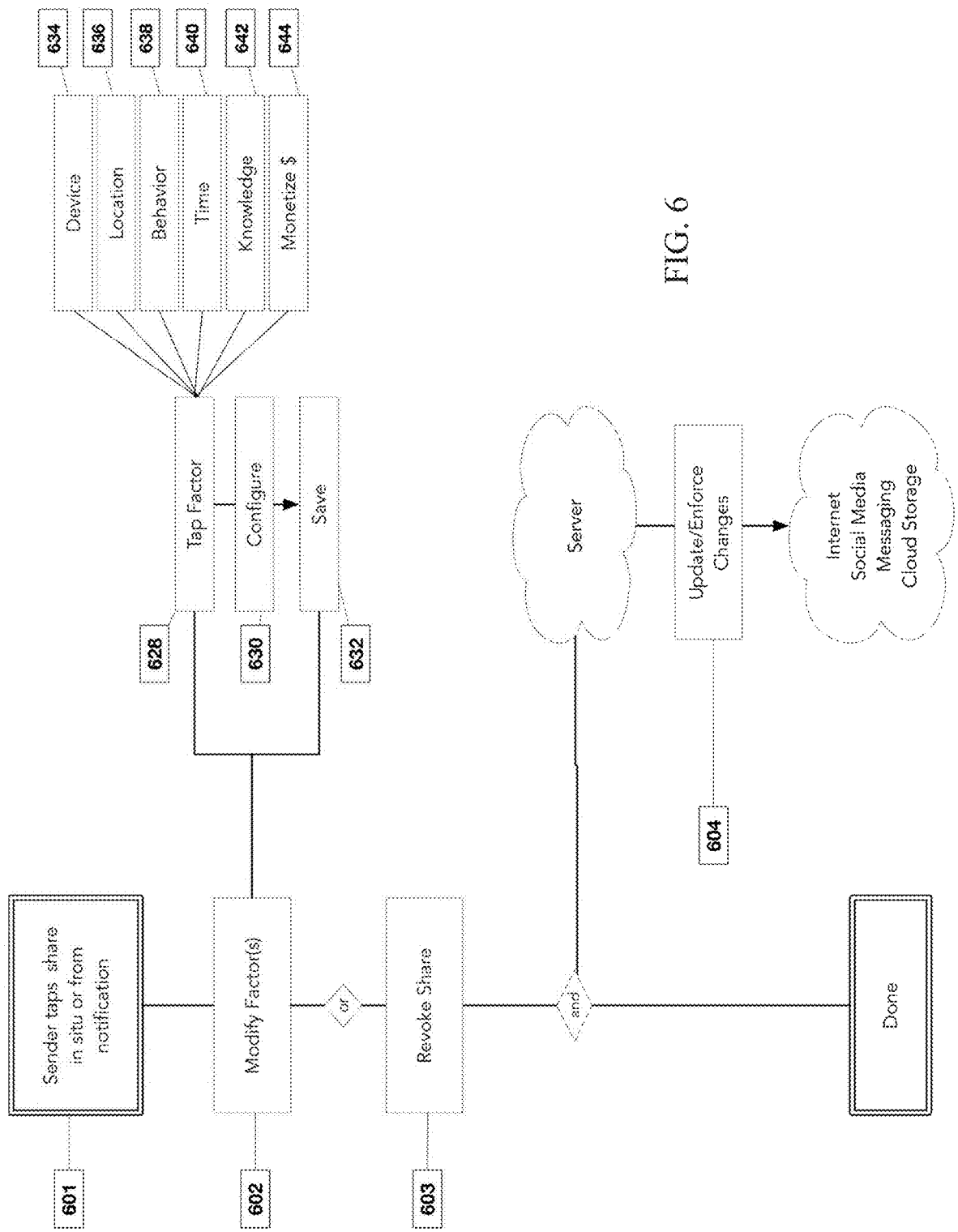
FIG. 6 is a flow chart of one embodiment of the method and shows the sender receiving notification of share access attempt, optionally modifying share security and payment parameters, and updating and enforcing changes globally, or simply revoking access to the share or asset for one or more recipients.

FIG. 6 is a flow chart of one embodiment of the method and shows the sender receiving notification of share access attempt, optionally modifying share security and payment parameters, and updating and enforcing changes globally, or simply revoking access to the share or asset for one or more recipients.

As shown in FIG. 6, the system may offer the sender a real-time decision 601 regarding recipient access with the ability to allow/revoke 603 one time or eternal access or decryption to the already transmitted or downloaded share. Optionally, the sender may also, in real-time, raise or lower security share requirements or monetization factor values 602 against existing shares, thereby requiring the server to immediate update 604 for all access attempts for that share and/or user.

In another embodiment, the sender may be notified of additional, unauthorized share attempts (in the case of a copy/forward or recipient account takeover) and simply rescind all access to the share in question, indefinitely 601, 603.

To modify the factors 602, the sender ideally "taps" 628 the application on the mobile computing device to choose and configure 630 security factors for the share and recipient authentication requirements with parameters, from among device 634, location 636, time 640, behavior 638, knowledge 642, and monetization 644 categories. The configured factors may be saved 632.

Additional Embodiments

In a preferred embodiment, the sender desires to simply, easily and safely share and control private, discrete or sensitive information with a recipient user across a public or private network, such as Facebook®, Instagram®, WhatsApp®, Telegram®, email, text messaging or chat platform such as Skype® or Facebook Messenger®. Within that context, there may be two categories of share: those that are suitable for public transmission (either direct or wide) and those that are not. Share that are generally for public, social consumption may include status updates, friendly photos, site reviews, links to public articles and content, interactive day-to-day chatting, safe jokes, product recommendations, introductions and the like. Things that would not be for public, unsecured sharing without additional recipient verification and independent access control, include credit card numbers, passwords, access codes, API keys, private photos, discrete location map links, encrypted messages, employee/employer documents, files, resumes/applications, medical records, parent/child communication, jokes, adult content, copyrighted material and time or value-sensitive materials or content.

The preferred embodiment may also involve the sender either authoring or selecting (by value or reference) the content to share on his or her mobile device, in this case, the link to a private file of passwords and a map to the office where they can be used to gain building and computer access there. The sender may author and copy the necessary data into the app of his or her mobile phone. The sender may then select password and geofence, making sure the recipient is the intended recipient on the right device and in the right location to access the share, regardless as to how and where the share is transmitted. The sender may also tap a 1× access limit so that the recipient may not forward or access it multiple times. The sender may then paste the newly secured share into Facebook® for a quick and easy direct message to the recipient. The recipient may receive the Facebook® message a while later on their registered Android device client, and may tap the share. The system may authenticate the recipient and shared asset across the security parameters and may return the real password file and office location message to the verified user, only once. The sender may then be immediately notified that the recipient received the share, and that the shared asset was deleted upon access. Everyone is know the identities of those who sent and received the file, that the share is no longer "in the wild", and that Facebook® had neither temporary nor long-term control or storage of the private asset. Yet, the platform might be and openly used as the transmission medium between two friends and colleagues. This embodiment may be used in any of the factors or parameters, across the same or different devices, networks or platforms, and required notification with permission online instead of mere notification. In any event, private content may be shared by mobile, over public networks between peers with complete authenticity, trust and control—all with just a few taps.

Another embodiment may involve the system protecting content shared over text messages between phones using the public phone data accounts. In this case, the sender may desire to share a private photo over text message (not advised). The sender may take the photo or navigates to select the photo from local storage, selects a wearable device factor requirement and shares back from the clipboard the secured asset via text message to the phone number of the intended recipient. The wearable factor ensures that the recipient has his or her wearable on, functioning, and in proximity with the mobile computing device receiving the text message. The recipient may receive the message in near real-time and click it. The server may validate the share, recipient, device and wearable context holistically and may display the real photo to the user (it's of their dog, doing tricks). In an alternate embodiment flow, the recipient may have left his or her phone on the desk whilst they visit the restroom. A colleague may pick up the unlocked phone and view the message. The colleague may click on it, yet the system may not reveal the share content since the real recipient and their wearable are not nearby, even though this new user has the device and is logged in as the "proper" use to access the sharing account. The colleague even forwards the text message (also a no-no) to his or her own phone, hoping to open it at their leisure and see the photo when the recipient returns with the wearable in proximity. However, to no avail, both the device and wearable don't match together and the true recipient, sender, and share are still protected. It is real privacy with a tap.

Another embodiment may involve sharing a social media link from one platform to another, for example, in this case Twitter® to Instagram®. The sender may take some private content shared with him via the system disclosed herein and attempts to post publicly on Instagram. Because the original sender did not intend for anyone but the original recipient, the original sender simply his or her mobile computing device to revoke all access, no matter how many times the content was copied, forwarded or distributed without his or her permission. All additional attempts to access by invalid recipients are met with denial, regardless of their credentials. Optionally, the original recipient may also be revoked for his or her inappropriate conduct with the senders content.

Another embodiment may involve real-time chat. The sender may desire to state something private over Skype® chat—e.g., that the sender did not want in the logs. The sender authors a quick message through the server, selects knowledge and enters a secret challenge word to access the share. The sender may choose the user and paste the share right back into the original Skype® chat window. The recipient taps the share which is instantly validated on the right device, prompting the recipient to enter the agreed-upon "secret word". Upon doing so, the share is revealed on the device and the thoughts are securely and privately communicated without any content lasting in the logs or Skype® servers.

Yet another embodiment may involve sharing a cloud storage file on Dropbox® where the sender desires to exercise location and permission control over the share. The sender navigates in Dropbox® and selects a file in the clipboard, chooses location parameters (in my immediate area) and taps notification control. The sender then simply pastes the clipboard back into an email, in this case, and sends the file to three (3) colleagues. Two colleague recipients pick up the email, tap the link and open the Dropbox® share instantly because they are on the right device and in the immediate location. However, the third colleague recipient is out of range and upon attempt to access. The sender is notified of the failure and where the colleague is located at the time. The sender is satisfied with the location and taps "permit" to allow the college to access, even though they were out of range.

Another embodiment may be protecting a social payment between peers over a public platform. In this case, the sender may desire to send a payment using the social media platform's native method of typing a simple name+hashtag payment value to send some money to a friend. Since the friend is new (<6 months) and the amount of money is over $100, the sender taps the app to add device+behavior to the pay-by-link share. The sender may make sure that the recipient understands to always tap the screen 3 times (behavior) to get the money. The sender shares the secured link and unfortunately fumbles the name auto-fill, sending the money to a similarly named user on the platform. The wrong user sees the share and taps to get the money. The false recipient was met with immediate failure and the sender was immediately notified of who the false user was and where they attempted. The sender quickly repaired the target name and re-sent properly, where the recipient picked up the payment, authenticated, and received their money without incident. The stale share in the hands of the wrong user cannot be retried, forwarded or hacked in anyway, to the relief of the sender.

In another embodiment, a sender may wish to forward a map link to several party attendees but does not want other non-invitees to get the location. The sender may also still wishes to use Twitter® out of convenience. The sender pastes in the party location with a message about timing and attire, chooses device+knowledge (party password is "madmen") and posts the link from their clipboard into Twitter®. The sender may also choose an alternate location to "wild-goose chase" any errant partiers. A few stragglers got the link (based on sloppy valid invitees for forwarded the post) and clicked it, but instead of finding a hard failure, they were given instructions to head across town to the empty but nonetheless charming hotel where they spent the night in protected isolation from the main party.

Another embodiment may involve the mutual authentication requirement for multiple recipients. The sender may attach a PDF file and chooses time+synchronization, of which they as the author are one of the required recipients. Posting and sharing the file over public email, each recipient taps the share and authenticates on their device, pending waiting for the others. The author/sender may finally "join" and all can now see the file in question. This way the sender can ensure nobody sees the file before anyone else, for legal or simple courtesy reasons.

Yet another embodiment may involve the popular desire to revoke a file, photo, message, or email once it has been sent. Such career or privacy restoring capabilities would be powerful if possible and are made elegantly simply by the system. The sender may select and paste the secured photo into a message, choosing notification with permission as the factor, and shares back in WhatsApp® to the recipient list. However, upon later inspection, the sender may share to the entire network, not just the key friends. Since the sender chose notification, the sender simply waits for the first person to try to access, denies and revokes the photo completely. Now each message is effectively retrieved with no trace in the WhatsApp® databases, servers or routers. The sender can simply re-share to the proper recipients or forget the whole affair, career or privacy intact.

Another embodiment may involve the ability to monetize social content over any messaging or social channel, such as paparazzi photos or new music from an artist or a quick video from a popular blogger. Rather than push this content out unsecured, subject only to ad revenue on popular media platforms or via a 30% cut from an in-app purchase, the sender may author or select the desired media and taps $1 monetization factor. The sender pastes the content to share over all of their social media and web properties. When fans tap the share anywhere they encounter it, they may get a free preview but are enticed to swipe to pay and then see, download and own the entire content. The payment flows peer-to-peer (fan to artist) in the form of an independent social electronic payment, not subject to the interim platform fees, cuts or deductions. Completing the peer the payment acts just like passing a security factor and "unlocks" or authenticates access for the recipient—just as geofencing, time or passwords would do. Artists can optionally set a time for the content to be "for fee" after which is becomes "for free" and open to unfettered viral distribution once the content has been properly monetized during its initial stages of popularity and scarcity.

Another embodiment may be a bespoke mobile app used to secure and monetize anything shared from a device, no matter how, when or where it is shared or with whom. Artists and creators can channel their content over the system disclosed herein by selection and configuring security and monetization parameters, sharing content over social, messaging and cloud storage channels, and managing and controlling access, payments and revocation, directly from their mobile device, in real-time.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A computer-aided method for peer asset authentication and asset control, the steps comprising:
providing a server application;
prompting a user to select a share on a first computing device, such that a selected share is created;
prompting said user to configure said selected share with one or more authentication factors on said first computing device, such that a configured and selected share is created wherein said authentication factors are selected from the group of authentication factors consisting of: device, location, time, behavior, knowledge, and monetization;
receiving said configured and selected share from said first computing device by said server application;
returning a secured share link to said first computing device;
sharing said secured share link with one or more second computing devices of one or more recipients via one or more electronic transmissions;
accepting by said server application one or more authentication engagements by said one or more recipients to determine if one or more recipients are authenticated to have access to said configured and selected share in said secured share link;
comparing said one or more authentication engagements to said one or more authentication factors by said server application; and
providing an access to said configured and selected share to said one or more recipients whose said one or more authentication engagements match up with said one or more authentication factors, said access provided on said one or more second computing devices wherein said secured share link is configured to only be accessible by said one or more recipients via a synchronicity, such that at least two of said one or more recipients are required by said server application be mutually and synchronously engaged with the secured share link.

2. The method of claim 1, wherein said one or more recipients having valid access to said configured and selected share have access for a set duration of time.

3. The method of claim 1, wherein the monetization factor comprises one or more valid peer electronic payments from said one or more recipients to said user in an amount specified by said user.

4. The method of claim 1, wherein said share is selected from the group of shares consisting of: a data file, an image, a textual content, an audio file, an audio stream, a video file, a video stream, an encrypted file, a hyperlink, and a chat stream.

5. The method of claim 1, wherein said share is selected remotely on said first computing device.

6. The method of claim 1, wherein said one or more electronic transmissions is selected from the group of electronic transmissions consisting of: a social network platform, a social media, a text message, an instant message platform, an email, a hyperlink, a content stream, an intranet, an Internet, and an interactive chat.

7. The method of claim 1, wherein said secured share link is shared to one or more recipients by reverse proxy to hide a source location of said secured share link.

8. The method of claim 1, further comprising the steps: notifying said user when any of said one or more recipients successfully accesses said configured and selected share.

9. The method of claim 1, further comprising the step of: accepting one or more valid peer electronic payments made by said one or more recipients;
wherein said access is only granted if said one or more valid peer electronic payments are made and if said one or more authentication engagements match up with said one or more authentication factors.

10. The method of claim 1, wherein said configured and selected share is encrypted.

11. The method of claim 1, wherein at least one element of synchronicity is selected from the elements consisting of: time, location, proximity, sequence, and other relational parameters.

12. The method of claim 1, wherein said secured share link is configured to only be accessible by said one or more recipients via a synchronicity, such that at least one of said one or more recipients and said user are required by said server application be mutually and synchronously engaged with the secured share link.

13. The method of claim 12, wherein at least one element of synchronicity is selected from the elements consisting of: time, location, proximity, sequence, and other relational parameters.

14. The method of claim 1, further comprising the step:
monitoring, such that said user tracks or is notified of said one or more authentication engagements by said one or more recipients.

15. The method of claim 14, wherein said monitoring step allows said user to override said one or more authentication factors, such that said user is able to allow or deny access to said share to said one or more recipients in real-time.

16. The method of claim 1, wherein said share is authored by said user.

17. The method of claim 1, wherein said sharing of said secured share link with said one or more recipients is revoked by said user.

18. A computer-aided method for peer asset authentication and asset control, the steps comprising:
providing a server application;
prompting a user to select a share on a first computing device, such that a selected share is created;
prompting said user to configure said selected share with one or more authentication factors on said first computing device, such that a configured and selected share is created;
receiving said configured and selected share from said first computing device by said server application;
returning a secured share link to said first computing device;
sharing said secured share link with one or more second computing devices of one or more recipients via one or more electronic transmissions;
accepting by said server application one or more authentication engagements by said one or more recipients to determine if one or more recipients are authenticated to have access to said configured and selected share in said secured share link;
comparing said one or more authentication engagements to said one or more authentication factors by said server application;
providing an access to said configured and selected share to said one or more recipients whose said one or more authentication engagements match up with said one or more authentication factors, said access provided on said one or more second computing devices; and notifying said user regarding whether any of said one or more recipients successfully accessed said configured and selected share;

wherein said one or more recipients having valid access to said configured and selected share have access for a set duration of time;

wherein said one or more authentication factors comprise a monetization factor, which comprises one or more valid peer electronic payments from said one or more recipients to said user in an amount specified by said user;

wherein said secured share link is shared to one or more recipients by reverse proxy to hide a source location of said secured share link;

wherein said access is only granted if said one or more valid peer electronic payments are made and if said one or more authentication engagements match up with said one or more authentication factors; and wherein said configured and selected share is encrypted.

* * * * *